(12) United States Patent
Bauer

(10) Patent No.: US 6,616,208 B1
(45) Date of Patent: *Sep. 9, 2003

(54) TRUCK BED EXTENSION

(76) Inventor: Còrdell Eric Bauer, 7003 Camino Del Vistazo, San Clemente, CA (US) 92673

( * ) Notice: Subject to any disclaimer, the term of this patent is extended or adjusted under 35 U.S.C. 154(b) by 0 days.

This patent is subject to a terminal disclaimer.

(21) Appl. No.: 10/224,194

(22) Filed: Aug. 20, 2002

Related U.S. Application Data

(63) Continuation of application No. 09/994,281, filed on Nov. 26, 2001, now Pat. No. 6,435,588, which is a continuation-in-part of application No. 09/736,895, filed on Dec. 12, 2000, now Pat. No. 6,322,125, which is a continuation-in-part of application No. 09/247,651, filed on Feb. 9, 1999, now Pat. No. 6,158,797.

(51) Int. Cl.[7] .............................................. B62D 25/00
(52) U.S. Cl. ..................... 296/61; 296/57.1; 296/26.11; 414/537
(58) Field of Search ........................ 296/26.08, 26.11, 296/26.1, 26.12, 26.13, 37.6, 55, 57.1, 61; 414/537

(56) References Cited

U.S. PATENT DOCUMENTS

| 4,472,639 A | 9/1984 | Bianchi | 296/26 |
|---|---|---|---|
| 4,531,773 A | 7/1985 | Smith | 296/26 |
| 4,596,417 A | 6/1986 | Bennett | 296/61 |
| 4,944,546 A | 7/1990 | Keller | 296/61 |
| 5,244,335 A | 9/1993 | Johns | 296/61 |
| 5,425,564 A | 6/1995 | Thayer | 296/57 |
| 5,468,114 A | 11/1995 | Hickerson | 296/61 |
| 5,538,307 A | 7/1996 | Otis | 296/61 |
| 5,597,195 A | 1/1997 | Meek | 296/61 |
| 5,645,394 A | 7/1997 | Hays | 414/547 |
| 5,752,800 A | 5/1998 | Brincks et al. | 414/537 |
| 5,755,480 A | 5/1998 | Bryan | 296/26 |
| 5,788,311 A | 8/1998 | Tibbals | 296/26 |
| 5,791,717 A | 8/1998 | Reich et al. | 296/61 |
| 5,813,714 A | 9/1998 | Lipinski et al. | 276/61 |
| 5,816,638 A | 10/1998 | Pool, III | 296/26 |
| 5,823,596 A | 10/1998 | Kulesza | 296/26 |
| 5,988,725 A | 11/1999 | Cole | 296/61 |
| 5,993,135 A | 11/1999 | Wolgamood | 296/61 |
| 6,059,344 A | 5/2000 | Radosevich | 296/61 |
| 6,158,797 A | 12/2000 | Bauer | 296/61 |
| 6,227,593 B1 | 5/2001 | De Valcourt | 296/26 |
| 6,250,874 B1 | 6/2001 | Cross | 296/61 |
| 6,322,125 B2 | 11/2001 | Bauer | 296/26 |
| 6,435,588 B1 | 8/2002 | Bauer | 296/26 |

Primary Examiner—D. Glenn Dayoan
Assistant Examiner—Patricia L. Engle
(74) Attorney, Agent, or Firm—K. David Crockett, Esq.; Crockett & Crockett

(57) ABSTRACT

A truck bed extension that is convertible into a pair of ramps. The truck bed extension is comprised of a left truck bed extension and a right truck bed extension, each truck bed extension comprising a back wall section, a side wall extension section and a ramp lip. The side wall extension, ramp lip and back wall section are hinged together to allow the truck bed extensions to be straightened when detached from the truck bed and used as a dual ramp.

11 Claims, 5 Drawing Sheets

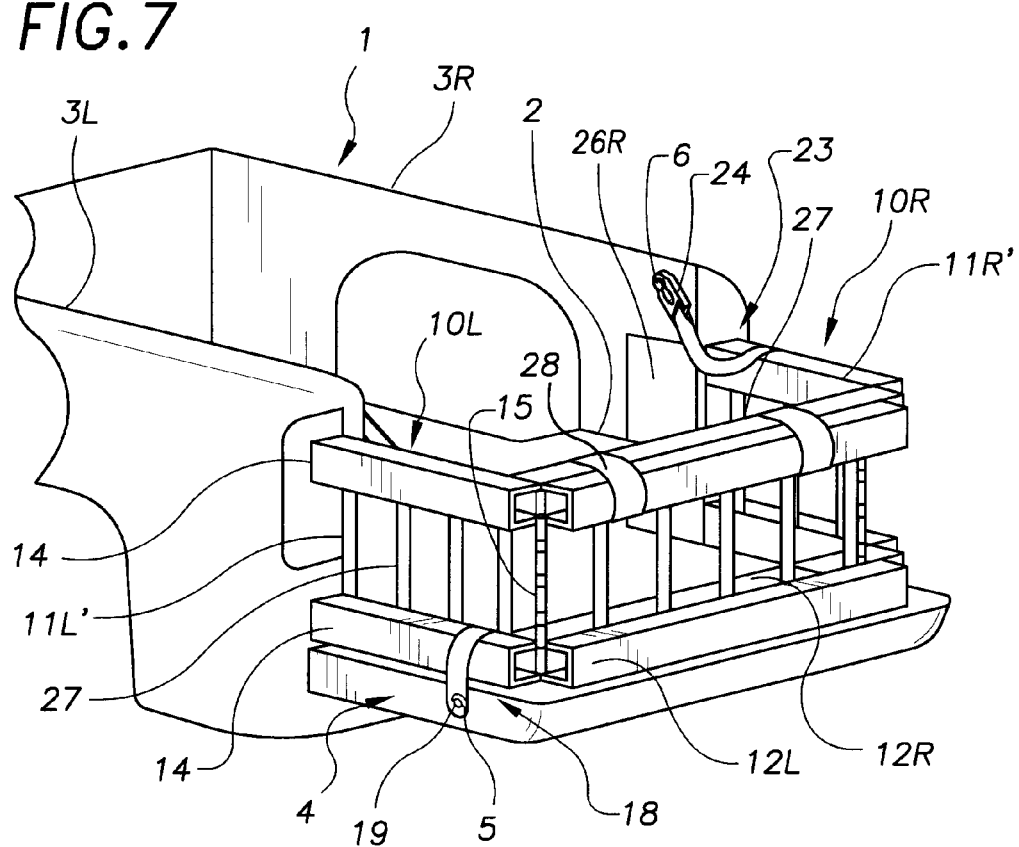
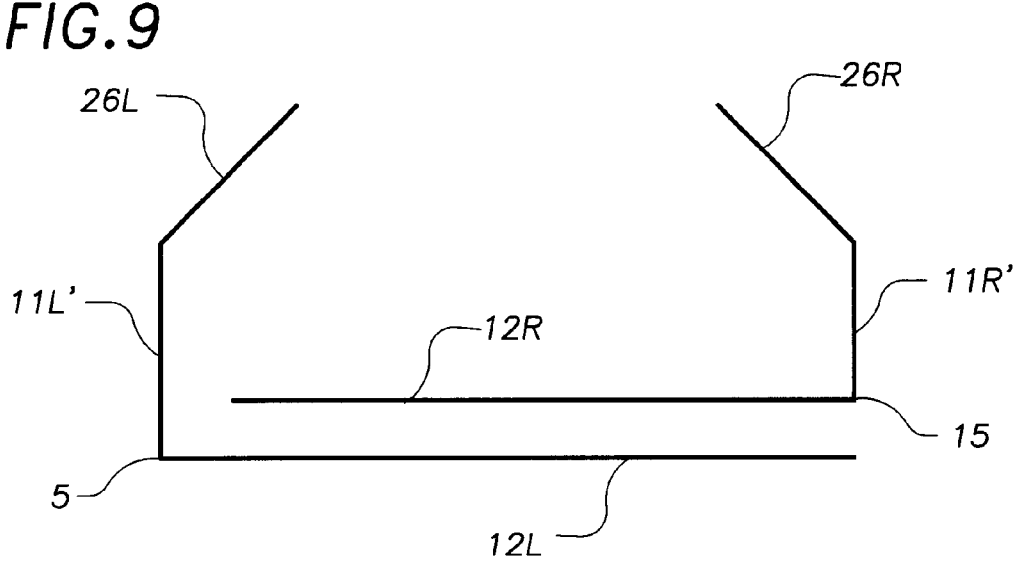

TRUCK BED EXTENSION

This application is a continuation of U.S. application Ser. No. 09/994,281 filed Nov. 26, 2001, now U.S. Pat. No. 6,435,588 issued Aug. 20, 2002, which is a continuation-in-part of U.S. application Ser. No. 09/736,895 filed Dec. 12, 2000, now U.S. Pat. No. 6,322,125 issued Nov. 27, 2001, which is a continuation-in-part of U.S. application Ser. No. 09/247,651 filed Feb. 9, 1999, now U.S. Pat. No. 6,158,797 issued Dec. 12, 2000.

FIELD OF THE INVENTIONS

The invention relates to the field of truck design.

BACKGROUND OF THE INVENTIONS

Pick up truck cargo beds may be extended with the use of extensions added to the bed after manufacture of the truck. Ramps may also be fitted to the pick up truck to facilitate loading cargo. Both the truck bed extension and the ramp are often used as temporary modifications of a typical small pick up truck. Combining the functions of the truck bed extension and ramp, making the bed extension releasably attached from the truck, and minimizing the bulk of the truck bed extension, allows the owner of the truck to temporarily modify the truck to extend the bed, eliminates the need to carry a ramp to load, and provides for easier storage when not in use.

SUMMARY

The truck bed extension described below is releasably attached to a typical pick up truck bed to extend the back wall of the bed. The truck bed extension is comprised of three panels, including a back wall and two side walls, which are hinged together to allow the truck bed extension to be straightened when detached from the truck bed and used as a ramp or ladder. The truck bed extension includes rotational stops or rotational locks which maintain the extension in a straight condition when unfolded for use as a ramp. The rotational stops may take the form of U-channel rails protruding from the outside/bottom of the extension. Alternatively, the truck bed extension is comprised of a pair of ramps, each ramp comprising a back wall section, a side wall extension, and a ramp lip. When installed as a truck bed extension, the back wall sections nest against each other and are strapped together to re-establish the back wall for the truck bed.

BRIEF DESCRIPTION OF THE DRAWINGS

FIG. 7 is an illustration of the truck bed extension comprised of dual ramps installed on a typical truck bed.

FIG. 9 is a top view of the left and right truck bed extensions of the dual ramp system which form the truck bed extension.

DETAILED DESCRIPTION OF THE INVENTIONS

Figure 1:
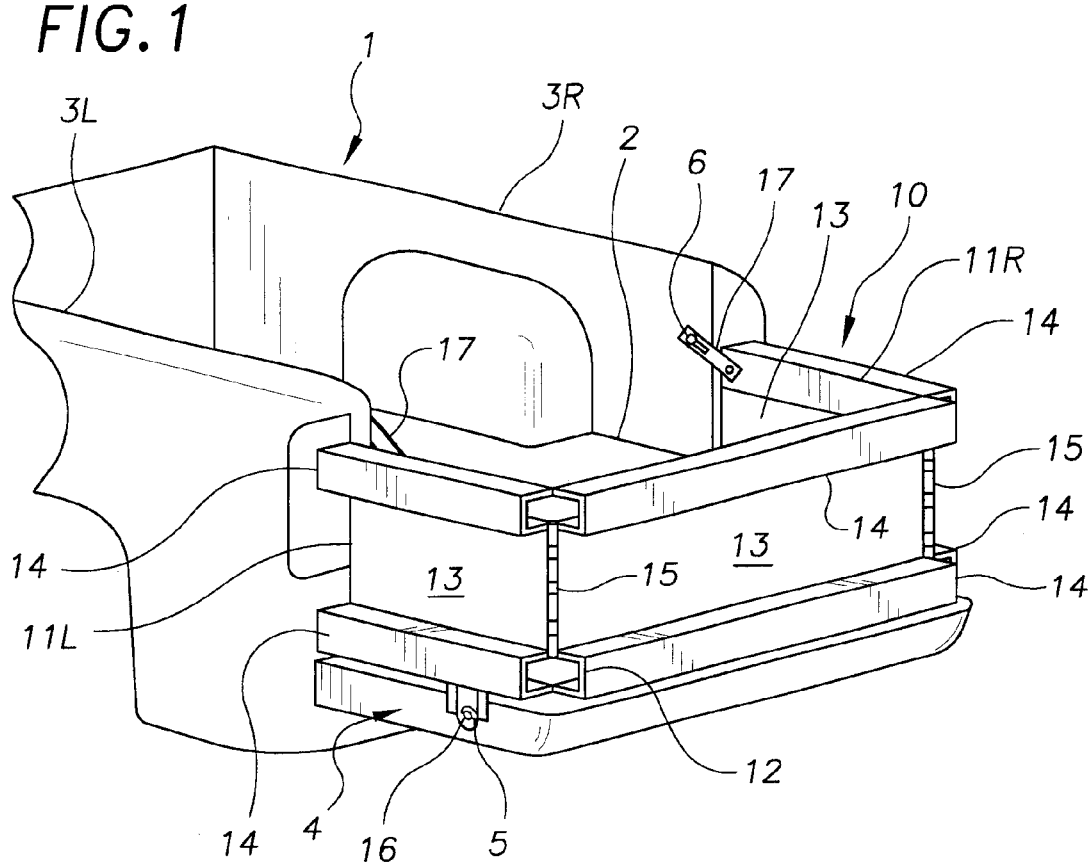
FIG. 1 is an illustration of the truck bed extension installed on a typical truck bed.

FIG. 1 is an illustration of the truck bed extension installed on a typical truck bed. The truck may be any truck, but for purposes of illustration it is a typical pick up truck with a truck bed 1. The truck bed is comprised of the truck bed floor 2, truck bed left and right sidewalls 3R and 3L, and the tailgate 4. The tailgate is hinged to the truck bed floor, and is shown in the open and fully lowered position. When raised, the tailgate is secured in the upright position when latches 5 on either side of the tailgate engage latch pins 6 near the back inside edge of the truck bed walls. The latches are raised by the lever handle on the outside of tailgate, which in this view is on the underside of the open tailgate. The truck bed extension 10 is shown installed on the truck bed. The tailgate is open, and typically lies flush with the truck bed floor, and will serve as an extension of the truck bed floor. The truck bed extension comprises a left side wall extension section 11L, right side wall extension section 11R, and back wall section 12 which reestablishes the back wall for the truck bed. The wall extensions 11L, 11R, and back wall section 12 may be made of aluminum or other strong material and may be of a solid construction, mesh, solid with holes, or may be made with slats or rungs like a ladder. The left side wall extension section and right side wall extension section are oriented at approximately right angles to the back wall section, and each section is vertically oriented at substantially right angles from the lowered tailgate, forming the truck bed extension which rests on the lowered tailgate. Each section of the extension comprises a wall panel 13, and each wall panel has deep rails 14 at the top and bottom of the panel. The rails may be solid, but to limit the weight of the entire assembly, they are preferably made of U-channel or hollow rectangular extrusions. The back wall extension is joined to the side wall extensions with hinges such as the piano hinges 15 shown in the illustration or other hinges such as a pin and slot assembly.

The truck bed extension is releasably attached to the truck with hardware that matches the latches and latch pins of the truck (which are predetermined by the truck manufacturer). On the bottom edge of the side wall extensions, latch pin 16 extends from the side wall extension into mating relationship with the pre-existing latch 5 of the tailgate. On the upper forward areas of the side wall extensions, key holed latch plates 17 extend upwardly to the latch pins on the truck bed, and mate with the latch pins to secure the device in place on the truck bed. The latch pin and latch plates of the truck bed extension are configured to match the pre-existing truck bed latches and latch pins of the truck bed. By using the latching hardware of the truck and matching latching hardware on the truck bed extension, the extension latch pins 16 can be released from the tailgate latches 5 by operating the lever handle of the tailgate which is ordinarily used to open the tailgate. The latch plates 17 can be slipped off the truck bed latch pins 6, and the entire truck bed extension easily removed from the truck. Thus, the truck bed extension can be installed and removed from the truck bed without using tools.

Figure 3:
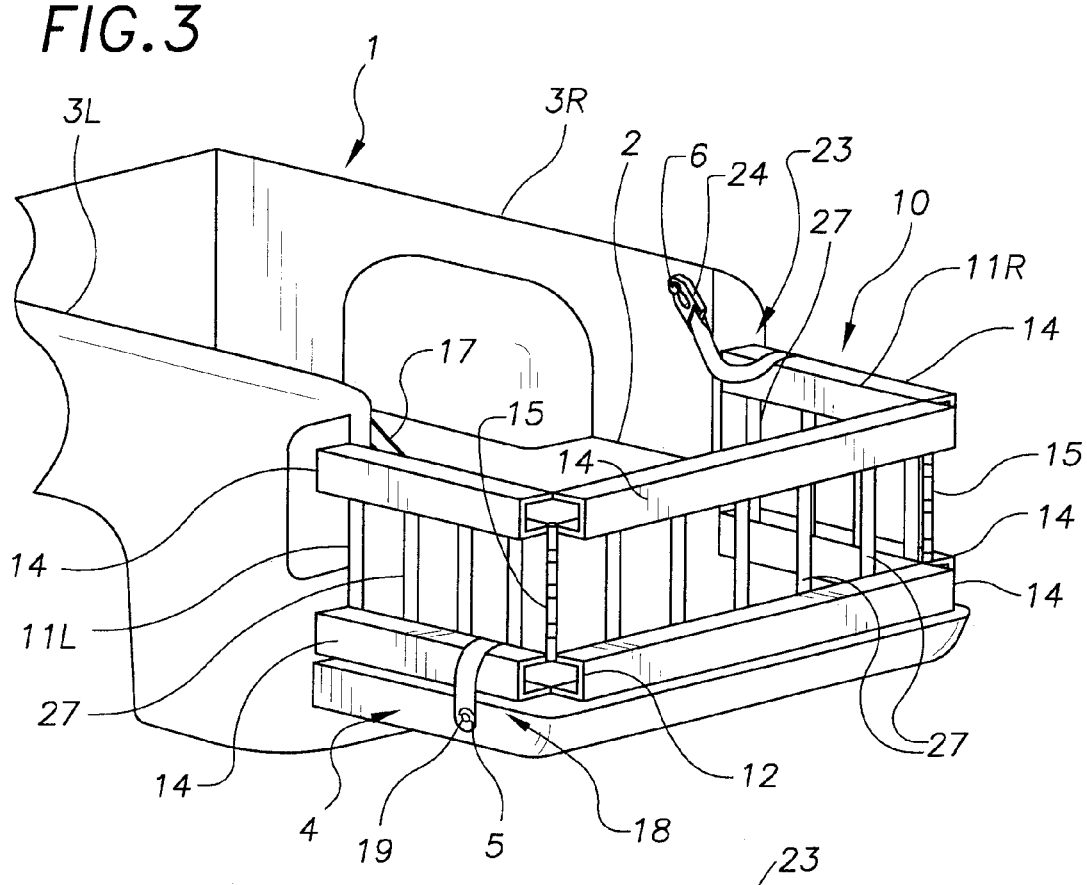
FIG. 3 is an illustration of the truck bed extension installed on a typical truck bed.
Figure 4:
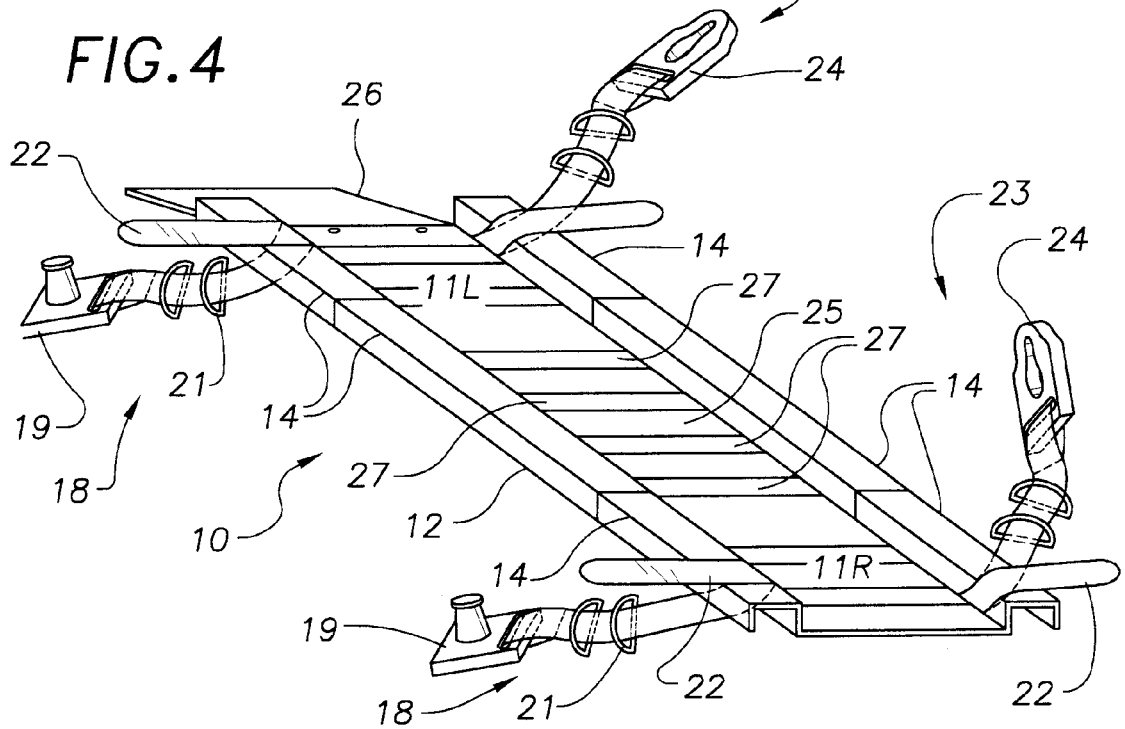
FIG. 4 is an illustration of the truck bed extension detached from the truck bed and unfolded to form a ramp.
Figure 5:
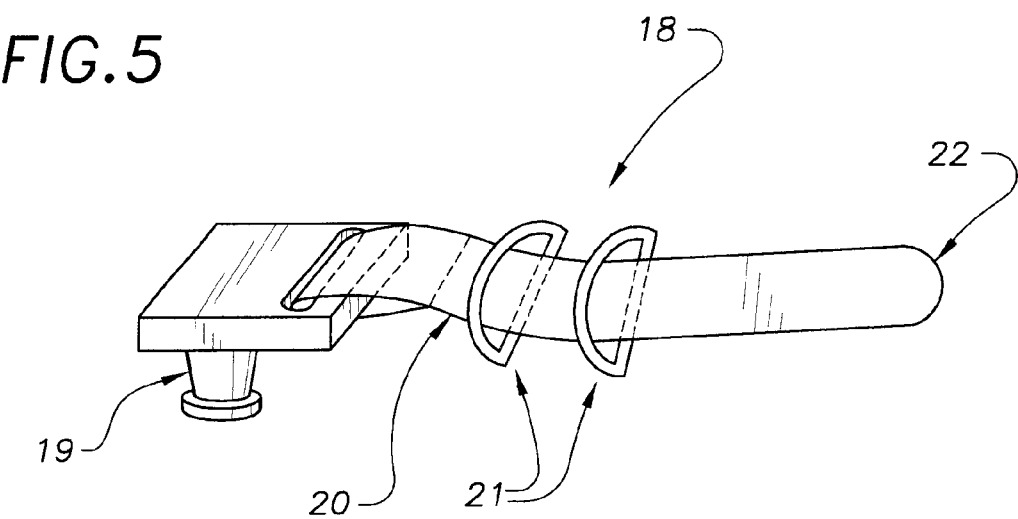
FIG. 5 is a strap assembly used to affix the truck bed extension to the truck tailgate.
Figure 6:
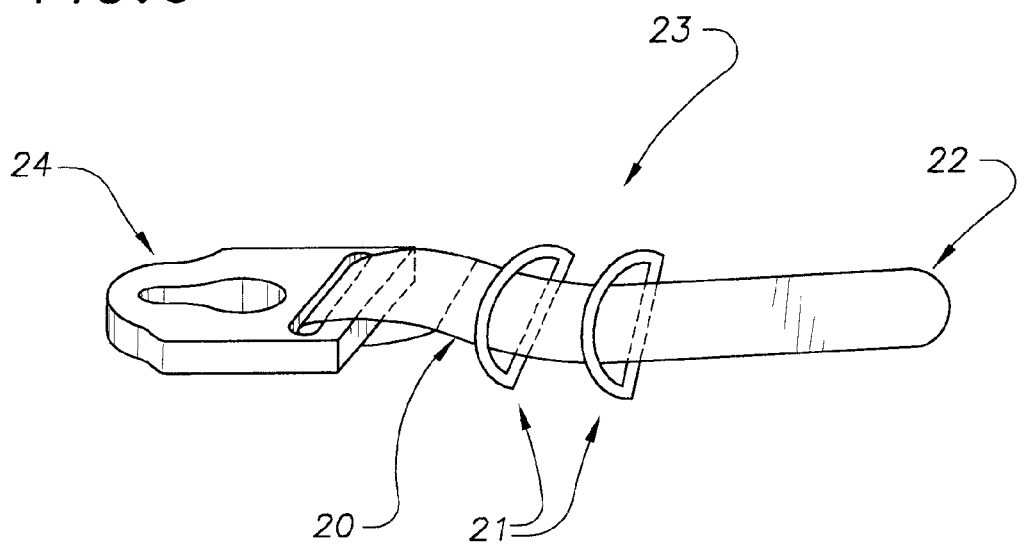
FIG. 6 is a strap assembly used to affix the truck bed extension to the inside of the truck bed wall.

Alternatively, the truck bed extension can be releasably attached to the truck with straps as shown in FIGS. 3 and 4 and detailed in FIGS. 5 and 6. FIGS. 3 and 4 illustrate the truck bed extension installed with straps as an alternate embodiment of the latching mechanism shown in FIG. 1.

The advantage of a strap down assembly over pre-fixed hardware latch plate and latch pin assemblies is that it accounts for the variation in the drop or vertical placement of tailgate latches and truck bed latch pin 6, making it easier to attach the truck bed extension to a number of different trucks with their specific tailgate latching mechanisms. FIGS. 3 and 4 also illustrate the wall extensions made of a rung construction, with numerous rungs 27 spanning between the rails 14 to create a surface suitable for rolling of a wheeled vehicle up or down the ramp.

FIG. 5 details a strap assembly 18 which comprises a latch pin 19 affixed at one end of a strap 20 and a set of D-rings 21 or the like a distance from the latch pin end of the strap assembly. The latch pin 19 mates with the tailgate latch 5. The end of the strap 22 loops under the rail 14 and feeds back and through the D rings 21, and when cinched fixes the truck bed extension 10 to the tailgate 4. FIG. 6 details a strap assembly 23 comprising a latch plate 24 affixed at one end of the strap 20 and a set of D-rings 21 or the like a distance from the door latch end of the strap assembly. The latch plate 24 is key-holed to mate with the truck bed latch pin 6. The end of the strap 22 loops under the rail 14 (or through the wall extension 11 if slatted) and feeds back and through the D rings 21, and when cinched fixes the truck bed extension 10 to the inside of the truck bed 3. The latch plate 24 and latch pin 19 configurations can vary depending on the type of truck for which the truck bed extension is being attached. FIGS. 5 and 6 show latch plate 24 and latch pin 19 configurations specially designed to work on a Ford F350™. Two sets of each strap assembly are used to affix the truck bed extension to the tailgate and truck bed as shown in FIG. 4 (only 1 set is pictured in FIG. 3). Alternatively, all four strap down assemblies could be bunge cords or straps with hooks.

Figure 2:
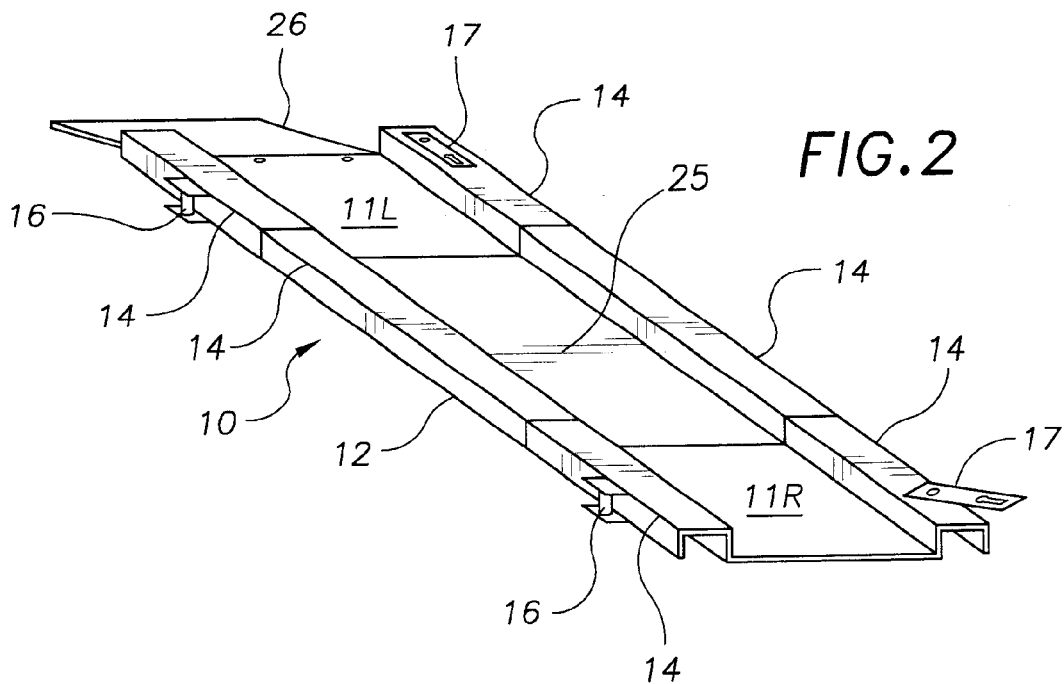
FIG. 2 is an illustration of the truck bed extension detached from the truck bed and unfolded to form a ramp.

The truck bed extension is convertible into a ramp which may be used to load cargo into the truck bed, and is well suited to facilitate rolling cargo such as motorcycles up into the truck bed. FIG. 2 is an illustration of the truck bed extension 10 detached from the truck bed and unfolded to form a ramp. The sidewall extensions 11R and 11L and backwall extension 12 unfold to form a straight ramp. The rails 14 extend upwardly from the walking surface 25 of the ramp and meet in interfering contact to prevent over-rotation of the hinge and maintain the sections in flat alignment. When the truck bed extension is in the straight configuration, the rails of the side wall extensions meet the rails of the back wall extension to limit unfolding of the sections about the hinges to maintain the ramp in a substantially straight configuration under load, and thus function as rotational stops. Rotational locks and locking hinges, such as those used on folding ladders, may also be employed to maintain the truck bed extension in the flat ramp configuration. The rails also function as side guards, preventing objects being transported on the ramp from sliding or rolling off the ramp. A ramp lip 26 may be provided on one or both side wall extensions, hinged to a side wall extension to permit the lip to be folded against the inside of the side wall extension when installed, and unfolded when the side wall extension is unfolded, creating a landing or level extension of the ramp for resting on the tailgate. The ramp lip need not necessarily be hinged to a side wall extension, but could be welded, bolted, or otherwise fastened to either side wall extension at a nominal angle to create the level extension. Further, the ramp lip could be an extension of either side wall extension and bent at the nominal angle to create the ramp extension.

Figure 8:
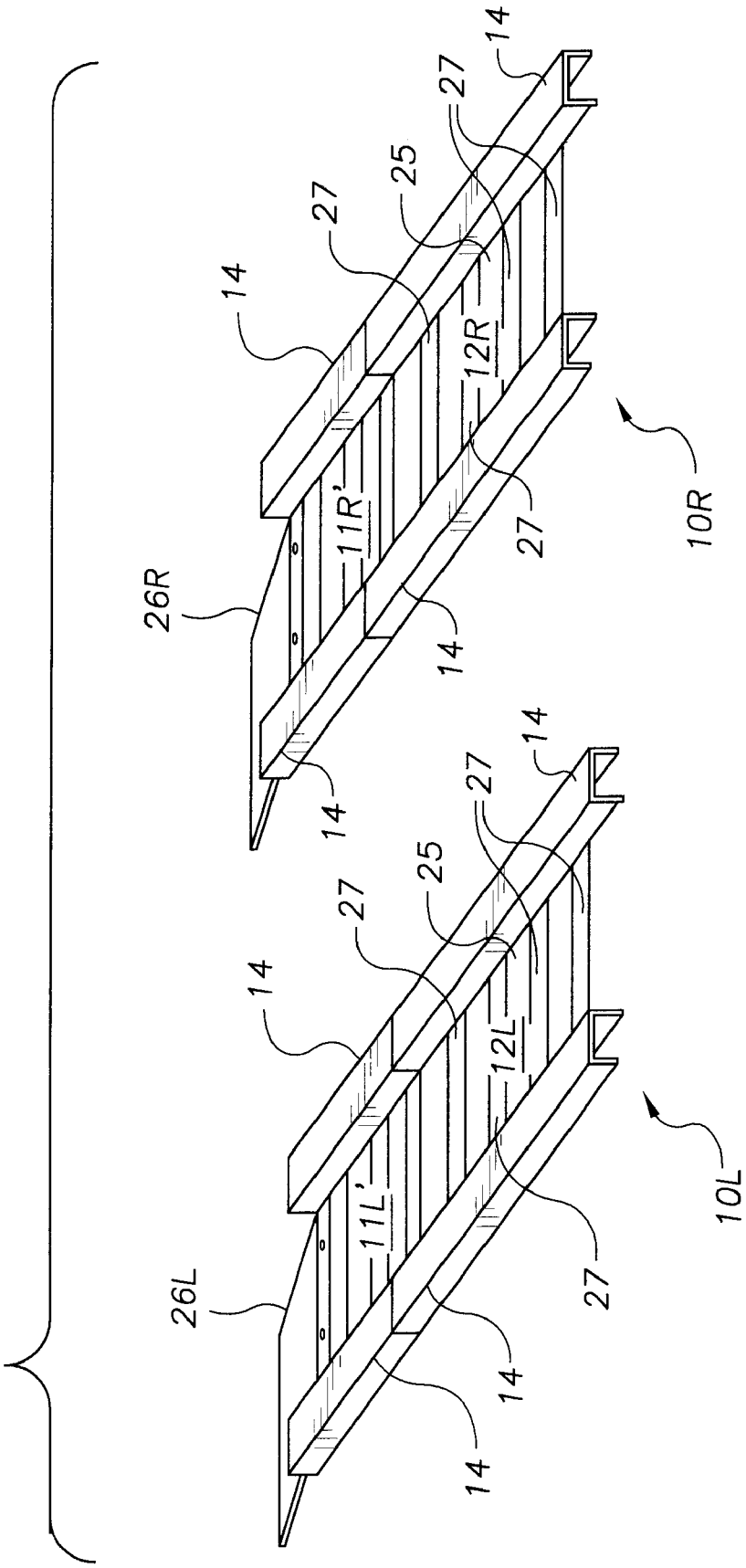
FIG. 8 is an illustration of the left truck bed extension and right truck bed extension detached from the truck bed and unfolded to form two ramps.

FIG. 7 is an illustration of another embodiment of a truck bed extension installed on a typical truck bed. The truck bed extension is comprised of a left truck bed extension 10L and a right truck bed extension 10R which, when detached from the truck bed can be used as a dual ramp to allow for loading of four wheeled vehicles (for example ATVs, riding lawnmowers, snowmobiles, race cars, and carts) and vehicles with wide rolling surfaces. FIG. 8 illustrates the left truck bed extension 10L and right truck bed extension 10R detached from the truck bed and unfolded to form two ramps. The left truck bed extension comprises a ramp lip 26L, a left side wall extension section 11L', and a back wall section 12L. The right truck bed extension comprises a ramp lip 26R, a right side wall extension section 11R', and a back wall section 12R. The back wall sections are joined to the left or right side wall extension sections with hinges 15. The ramp lip is attached to the left or right side wall extension sections with hinges or is welded, bolted or otherwise fastened. As shown in FIGS. 7 and 9, the back wall sections nest against each other and, when attached to one another, reestablish the back wall for the truck bed. The back wall sections may be held together by a strap 28, clip, magnet or other means. As shown, the left side wall extension section is longer than the right side wall extension section so that the entire truck bed extension is square with the tailgate. Accordingly, the relative lengths of the back wall sections are adjusted such that the overall length of the ramps will be the same. Conversely, the right side wall extension section could be longer than the left side wall extension section with the relative back wall sections adjusted accordingly. (The left and right side wall extensions may be of identical length, if looseness in the nested arrangement is tolerable, or adjustment in the strap down assembly length or latch plate location may be made to fix the position of the side wall sections in offset relationship allowing neatly parallel disposition of the two back wall sections 12L and 12R.) The left truck bed extension 10L and right truck bed extension 10R can be releasably attached to the truck with strap assemblies 18 and 23 as shown in FIG. 7, or with the extension latch pins 16 and latch plates 17 as shown in FIG. 1.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A truck bed extension for use with a truck with a truck bed wherein the truck bed comprises a truck bed floor, left and right truck side walls, a tailgate hinged to the truck bed floor and having means for releasably attaching the tailgate to the side walls, said tailgate capable of being lowered to comprise an essentially flat extension of the truck bed floor, said truck bed extension comprising:

a left side wall extension section, a right side wall extension section, and a back wall section, said left side wall extension section and right side wall extension section being rotatably joined by hinges to the back wall section;

means for securing a ramp lip to one of said side wall extension sections;

means for releasably attaching the truck bed extension to the truck;

said left side wall extension section, right side wall extension section, and back wall section having a folded configuration in which the left side wall extension section and right side wall extension section are oriented at approximately right angles to the back wall section, forming a truck bed extension which may rest on the tailgate when the tailgate is lowered; and said left side wall extension section, right side wall extension section, and back wall section having a straight configuration in which the left side wall extension section and right side wall extension section are oriented in approximately straight alignment to the back wall section.

2. The truck bed extension of claim 1 wherein the means for securing the ramp lip to one of said side wall extension sections comprises a hinge.

3. The truck bed extension of claim 1 wherein said left side wall extension section, right side wall extension section, and back wall section each comprise a wall panel having a top edge and a bottom edge, with rails extending along the top edge and bottom edge of the wall panel, said rails extending from the wall panels so that, when the truck bed extension is in a straight configuration forming a ramp, the rails of the side wall extension sections meet the rails of the back wall section to limit unfolding of the sections about the hinges and maintain the ramp in said straight configuration, and wherein the ramp lip can be positioned on the extended tailgate of the truck and supported thereby.

4. The truck bed extension of claim 3 wherein the wall panel is comprised of a plurality of rungs spanning between the rails along the top edge and bottom edge of said wall panel.

5. A truck bed extension for use with a truck with a truck bed wherein the truck bed comprises a truck bed floor, left and right truck side walls, a tailgate hinged to the truck bed floor and having means for releasably attaching the tailgate to the side walls, said tailgate capable of being lowered to comprise an essentially flat extension of the truck bed floor, said truck bed extension comprising:

a left side wall extension section, a right side wall extension section, and a back wall section, said left side wall extension section and right side wall extension section being rotatably joined by hinges to the back wall section;

means for securing a ramp lip to one of said side wall extension sections;

means for releasably attaching the side wall extension sections to the truck side walls and tailgate;

said left side wall extension section, right side wall extension section, and back wall section having a folded configuration in which the left side wall extension section and right side wall extension section are oriented at approximately right angles to the back wall section, forming a truck bed extension which may rest on the tailgate when the tailgate is lowered; and said left side wall extension section, right side wall extension section, and back wall section having a straight configuration in which the left side wall extension section and right side wall extension section are oriented in approximately straight alignment to the back wall section.

6. The truck bed extension of claim 5 wherein said left side wall extension section, right side wall extension section, and back wall section each comprise a wall panel having a top edge and a bottom edge, with rails extending along the top edge and bottom edge of the wall panel, said rails extending from the wall panels so that, when the truck bed extension is in a straight configuration forming a ramp, the rails of the side wall extension sections meet the rails of the back wall extension section to limit unfolding of the sections about the hinges and maintain the ramp in said straight configuration, and wherein the ramp lip can be positioned on the extended tailgate of the truck and supported thereby.

7. The truck bed extension of claims 5 wherein the means for securing the ramp lip to one of said side wall extension sections comprises a hinge.

8. The truck bed extension of claim 6 wherein the wall panel is comprised of a plurality of rungs spanning between the rails along the top edge and bottom edge of said wall panel.

9. A truck bed extension for use with a truck with a truck bed wherein the truck bed comprises a truck bed floor, a left side wall and a right side wall, a tailgate hinged to the truck bed floor and having latching mechanisms for releasably attaching the tailgate to the side walls by mating with complementary latching mechanisms on each side wall, said tailgate capable of being lowered to comprise an essentially flat extension of the truck bed floor, said truck bed extension comprising:

a left truck bed extension comprising
a first ramp lip, a left side wall extension section, and a first back wall section, said left side wall extension section and first ramp lip being rotatably joined by hinges to said first back wall section;

a right truck bed extension comprising a second ramp lip, a right side wall extension section, and a second back wall section, said right side wall extension section and second ramp lip being rotatably joined by hinges to said second back wall section;

a means for releasably attaching the left truck bed extension to the left truck side wall and tailgate;

a means for releasably attaching the right truck bed extension to the right truck side wall and tailgate;

a means for releasably attaching the first back wall section to the second back wall section;

said left truck bed extension and right truck bed extension having a folded configuration in which the left side wall extension section is oriented at an approximately right angle to the first back wall section and the right side wall extension section is oriented at an approximately right angle to the second back wall section, and where the first back wall section is releasably attached to the second back wall section, forming a truck bed extension which may rest on the tailgate when the tailgate is lowered;

said left truck bed extension having a straight configuration in which the left side wall extension section is oriented in approximately straight alignment to the first back wall section;

said right truck bed extension having a straight configuration in which the right side wall extension section is oriented in approximately straight alignment to the second back wall section; and said left side wall extension section being longer than said right side wall extension section so that the left truck bed extension and right truck bed extension when in the folded configuration is square with the tailgate and wherein the first back wall section is shorter than the second back wall section such that the overall length of the left and right truck bed extensions when in the straight configuration are of the same length.

10. The truck bed extension of claim 9 wherein said left side wall extension section, right side wall extension section, first back wall section and second back wall section each comprise a wall panel having a top edge and a bottom edge, with rails extending along the top edge and bottom edge of the wall panel, said rails extending from the wall panels so that, when the left truck bed extension and right truck bed extension are in a straight configuration forming ramps, the rails of the left side wall extension section meet the rails of the first back wall section and the rails of the right side wall extension section meet the rails of the second back wall section to limit unfolding of the sections about the hinges and maintain the ramps in said straight configuration, and wherein the first ramp lip and the second ramp lip can be positioned on the extended tailgate of the truck and supported thereby.

11. The truck bed extension of claim 10 wherein the wall panel is comprised of a plurality of rungs spanning between the rails along the top edge and bottom edge of said wall panel.

* * * * *